INVENTOR
Ronald D. Kauffman,

BY R. P. Miller

ATTORNEY

Nov. 8, 1966 R. D. KAUFFMAN 3,283,987

AUTOMATIC MACHINE FOR BENDING AND SOLDERING TERMINAL LEADS TO CIRCUIT MODULES

Filed June 11, 1964 7 Sheets-Sheet 2

Nov. 8, 1966 R. D. KAUFFMAN 3,283,987

AUTOMATIC MACHINE FOR BENDING AND SOLDERING TERMINAL LEADS TO CIRCUIT MODULES

Filed June 11, 1964 7 Sheets-Sheet 5

Nov. 8, 1966 R. D. KAUFFMAN 3,283,987

AUTOMATIC MACHINE FOR BENDING AND SOLDERING TERMINAL LEADS TO CIRCUIT MODULES

Filed June 11, 1964 7 Sheets-Sheet 7

3,283,987

AUTOMATIC MACHINE FOR BENDING AND SOLDERING TERMINAL LEADS TO CIRCUIT MODULES

Ronald D. Kauffman, Allentown, Pa., assignor to Western Electric Company, Incorporated, New York, N.Y., a corporation of New York Filed June 11, 1964, Ser. No. 374,330
9 Claims. (Cl. 228—5)

This invention relates to an automatic machine for bending and soldering terminal leads to circuit modules and more particularly to a machine having facilities for forming short right angle bends in ribbon leads and then advancing the bent ends into position to be soldered to a heat sensitive circuit.

As explained in copending application, Serial No. 374,317, filed in the names of D. C. Kuhns and D. W. Ports on June 11, 1964, the securing of terminal leads to heat sensitive films or foils presents problems, in that heat cannot be directly applied to the junctions of the terminals and the films without subsequent damage. Further, the substrates for supporting the film or foil circuit paths are usually constructed of plastic or ceramic material that may be damaged by the direct application of the concentrated heat needed to effect the soldering or bonding.

An object of this invention is the provision of a new and improved machine for bending and securing terminal leads to circuit modules.

Another object of the invention is the provision of a machine for soldering thin ribbons of terminal lead stock to heat sensitive circuit patterns without damage to the circuit pattern or its supporting structure.

An additional object of the invention is the provision of a machine for bending ribbon leads and then advancing the bent ends into a position to engage a circuit pattern whereupon solder is flowed along the bent end sections to bond the leads to the circuit pattern.

A further object of the invention resides in a terminal bonding machine having rectilinearly movable elements which are moved in a first direction to cooperate with a die to bend terminal leads and are moved in a second direction to sever the terminal leads.

A still further object of the invention is the provision of a terminal lead soldering machine having heat facilities that are movable in a first direction into engagement with sections of solder wire and then movable transverse of the engaged solder to insure an even flow of the solder along bent sections of terminal leads.

With these and other objects in view, the present invention contemplates a machine for bending the ends of terminal lead ribbons and then soldering the bent ends to a heat sensitive thin film circuit whereafter the ribbons are severed leaving terminal leads laterally projecting from the film circuit. The machine includes a pair of opposed slides or carriages, one of which advances ribbons of terminal leads through a bending and severing die, and the other of which advances solder wires over the bent sections of the ribbons. A holding device supports and advances the thin film circuit into engagement with the ends of right angle bends whereupon a soldering device is actuated to melt the solder wire. The soldering device is initially moved into engagement with the solder wire and then moved transversely across the wires to insure an even flow of sloder down the bent ends of the terminals to form fillets of solder that bond the terminals to the thin film circuit. The transverse movement of the soldering device insures the even flow of solder without attendant peaking that may be caused by the return of the soldering device to the initial position. Finally, the severing and bending die is actuated to sever the terminals and bend the severed ends of the ribbons in anticipation of another cycle of operation of the machine.

Other objects and advantages of the present invention will become apparent upon reading the following detailed description when taken in conjunction with the accompanying drawings wherein.

Figure 17:
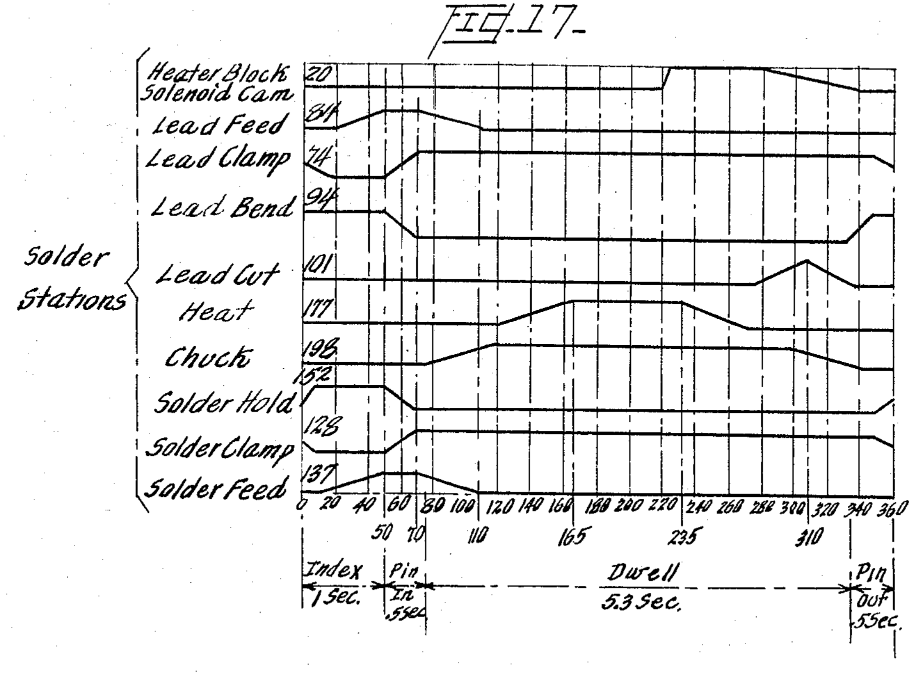

FIGS. 13, 14, 15, and 16 are sectional views taken through the bending and serving facilities to show the various positions assumed by the bending and severing elements during a cycle of operation; and FIG. 17 is a timing diagram using cam contours to schematically illustrate the relative movement of the various facilities during a cycle of operation of the overall machine.

GENERAL DESCRIPTION

Figure 1:
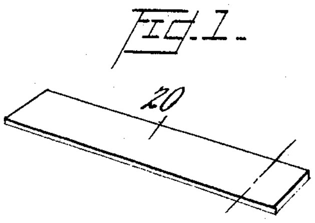
FIGS. 1–4 illustrate a section of terminal lead ribbon stock that is bent, abutted against a circuit film formed on a substrate, and then soldered to a circuit film by a machine embodying the principles of the present invention and shown in the other views.
Figure 3:
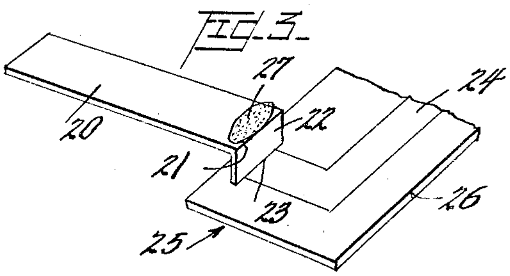
Figure 2:
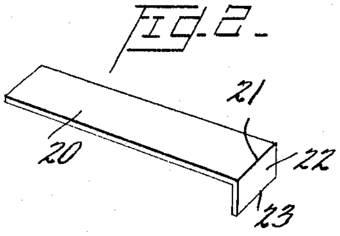
Figure 4:
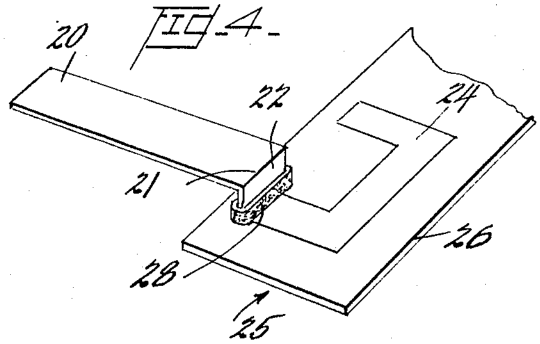

Referring first to FIGS. 1–4, there is shown a section of terminal lead stock 20 in a configuration of a ribbon or strip. As illustrated in FIG. 2, the ribbon 20 is bent along line 21 to provide a right angle bend section 22 having an end face 23. In FIG. 3, the end face 23 of the ribbon 20 is shown abutted against a circuit pattern or path 24 formed on a substrate 26 constructed of glass, ceramic, plastic, or other material that may be heat sensitive. The circuit pattern 24 and the substrate 26 comprises a circuit module generally designated by the reference numeral 25. The circuit pattern 24 may be either in the form of a metal film sputtered or vapor deposited on the substrate, or it may be in the form of a foil that is bonded or mechanically attached to the substrate. A glob of solder 27 is shown positioned along the line 21 of the bend. This solder 27 is heated and allowed to flow down the right angle bend section 22 onto the circuit pattern 24 to form a bonding fillet 28 completely surrounding the end of the bent section 22 as illustrated in FIG. 4.

Figure 5:
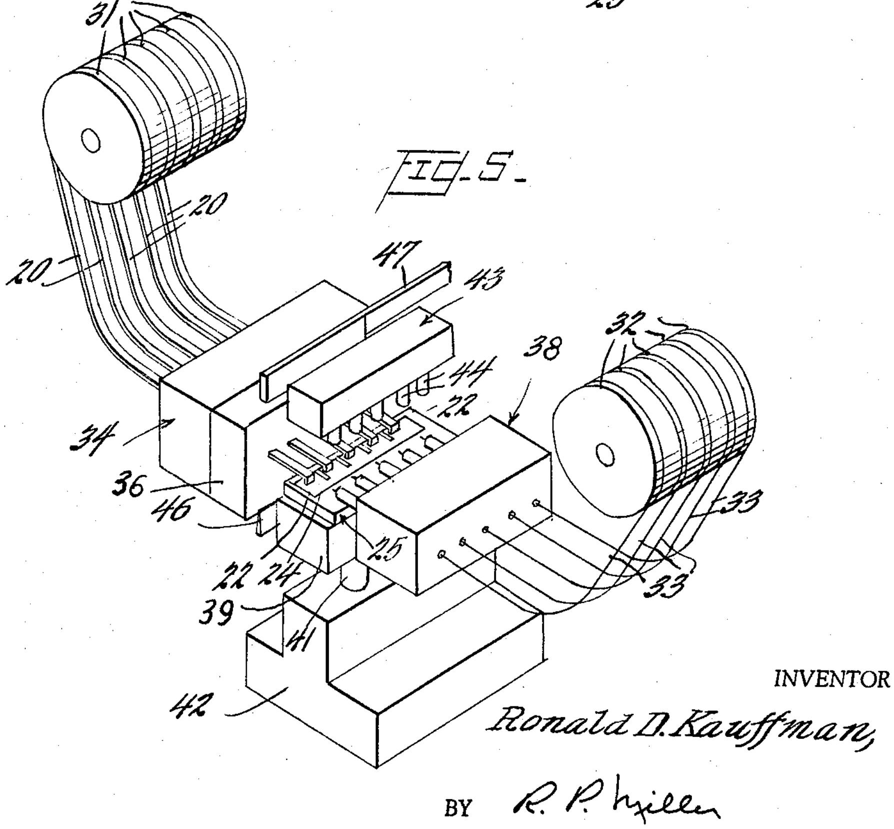
FIG. 5 is a schematic perspective view of a machine for securing terminal leads to a circuit film in a manner illustrated in FIGS. 1–4.

Referring now to FIG. 5, there is shown a machine for soldering a plurality of terminals to the circuit pattern. This machine includes reels 31 for holding supplies of terminal lead ribbons 20 and reels 32 for holding supplies of solder wires 33. These solder wires may be circular in shape and have a flux core. The terminal ribbons 20 are advanced by a feed mechanism generally designated by the reference numeral 34 through die block mechanism 36 to position and register the bent end sections 22 with the circuit pattern 24. The solder wires 33 are advanced by a feed mechanism 38 to position the ends of the solder wires in overlapping relationship to the lines 21 of bends formed in the terminal ribbons 20. The circuit module 25 is mounted in a vacuum holding block 39 which is attached to a guide rod 41 which is slidably mounted in a fixture 42. The fixture 42 may be mounted on a turntable to sequentially advance circuit modules 25 into position to have terminal leads bonded thereto.

When the bent section 22 and the solder wires 33 are advanced into overlapping relationship, the vacuum holding block 39 is removed in a vertical direction to move the circuit pattern 24 into abutting relationship with the end faces 23 of the bent sections 22. A soldering head 43 having iron coated copper core elements 44 is moved downwardly to advance the soldering elements 44 into engagement with the ends of the solder wires 33. The soldering elements are continuously heated by electrical resistance heaters and effectuate a melting of the solder whereupon the soldering head 43 is shifted transversely to distribute the solder so that it flows evenly down the bent sections to form the fillets 28 about the ends of the bent sections 22. Due to the transverse movement of the solder head 43, the subsequent return of the soldering head 43 to the initial position will not be accompanied by any peaking of the molten solder formed at the ends of the solder wires 33 or peaking of solder fillets 28.

Following the soldering of the ribbons 20 to the circuit pattern 24, a cutter 46 is operated to sever the terminals from the ribbons 20. A bending element 47 is now advanced downwardly to bend the severed ends of the ribbons 20 in anticipation of another cycle of operation of the overall machine.

The vacuum holding block 39 is moved downwardly and the fixture may be advanced to another fabricating station where additional terminal leads may be secured to the circuit pattern 24.

TERMINAL RIBBON FEED SEVERING AND BENDING MECHANISM

Figure 6:
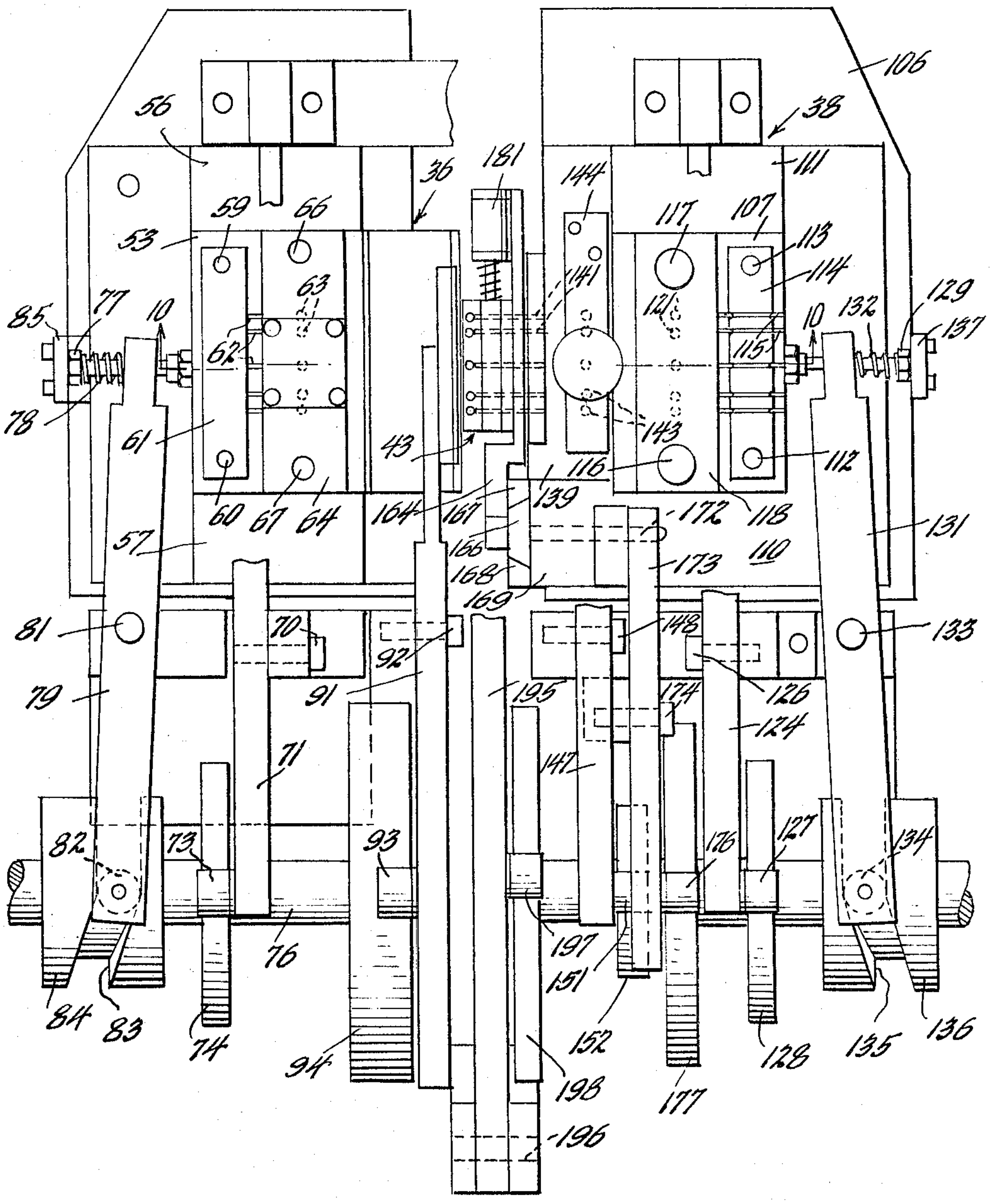
FIG. 6 is a top plan view of the details of the machine shown in FIG. 5 and particularly illustrating an arrangement of cam mechanisms for driving various component mechanisms.
Figure 7:
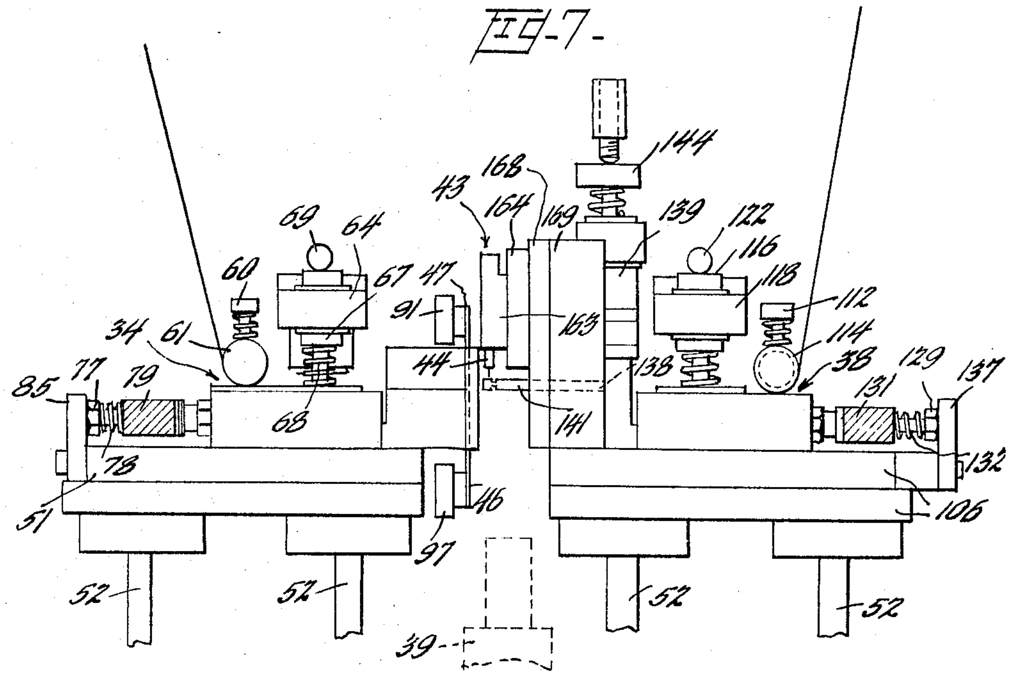
FIG. 7 is a side elevational view, partially cut away, of the overall machine showing the facilities for feeding, bending, and soldering the terminal leads to the circuit films.
Figure 10:
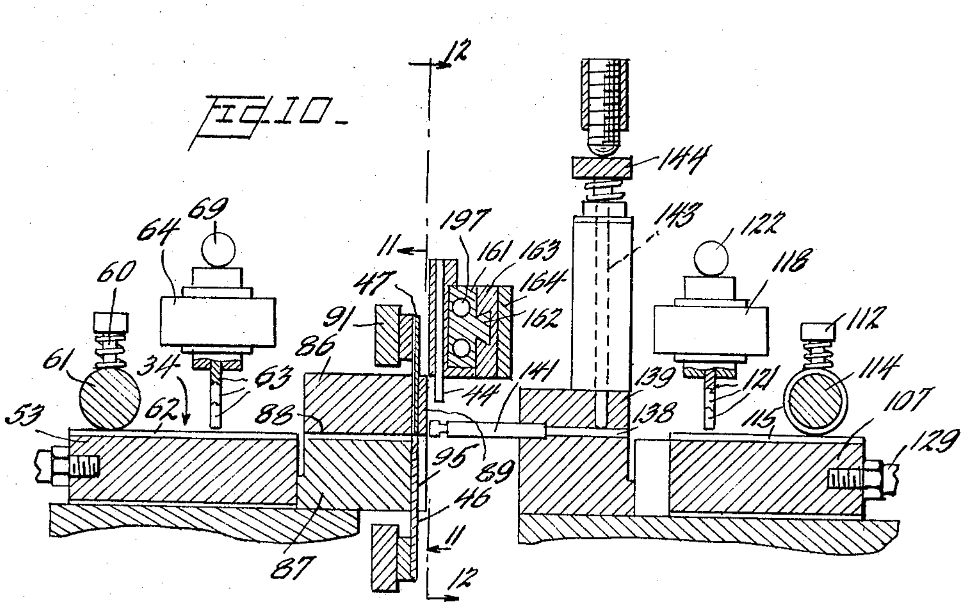
FIG. 10 is a sectional view taken along line 10—10 of FIG. 6 showing the bending and serving facilities in conjunction with the soldering facilities.
Figure 11:
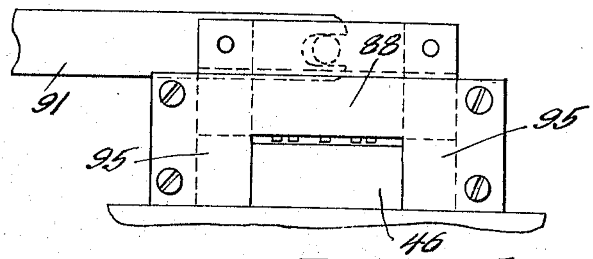
FIG. 11 is a view taken along line 11—11 of FIG. 10 illustrating the front of the bending and serving facilities.

Referring first to FIGS. 7 and 10, the terminal feed mechanism 34 is shown mounted on frame plates 51 supported by columns 52. This mechanism 34 includes a slide 53 having beveled edges 54 and 55 fitted within gibs 56 and 57 mounted on the top plate 51 (see FIGS. 6 and 8). Mounted on the slide 53 are a pair of headed pins 59 and 60 which supports a guide bar 61. Disposed between the guide bar 61 and the heads on the pins 59 are springs for urging the guide bar 61 and the ribbons 20 into alignment slots 62 in the slide 53.

In order to firmly hold the ribbons 20 against the slide 53, a group of spring loaded pins 63 are aligned with the ribbons 20 and are attached to a follower plate 64. The follower plate 64 is slidably mounted on guide rods 66 and 67 and is urged in an upward position by springs 68. A roller follower 69 (see FIGS. 7 and 8) engages the top of the plate 64 and is rotatably mounted on a lever 71 that is pivotally mounted about a headed pivot shaft 70. Attached to the opposite end of the lever 71 is a depending arm 72 which provides a mounting for a cam follower roller 73 that rides on a cam 74 secured to a shaft 76 (see FIGS. 6 and 8). When the cam 74 is rotated to present a lobe portion to the cam follower 73, the lever 71 is pivoted to move the roller 69 against the plate 64 and, thus, the spring loaded pins 63 are moved into firm engagement with the terminal ribbons 20 to force the ribbons against the slide 53.

Referring to FIGS. 6 and 7, the slide 53 is shown with a rearwardly extending bolt 77 about which is mounted a spring 78 that acts against a lever 79 pivotally mounted about a headed stud shaft 81. The rear extremity of lever 79 is provided with a cam follower roller 82 that rides within a cam slot 83 of a barrel cam 84 mounted on the shaft 76. As the barrel cam 84 is rotated, the lever 79 will be pivoted to advance the slide 53 along with the now-gripped terminal ribbons 20. The extent of movement of the slide 53 may be adjusted by turning of the bolt 77 to vary its position with respect to a stop bar 85.

Figure 8:
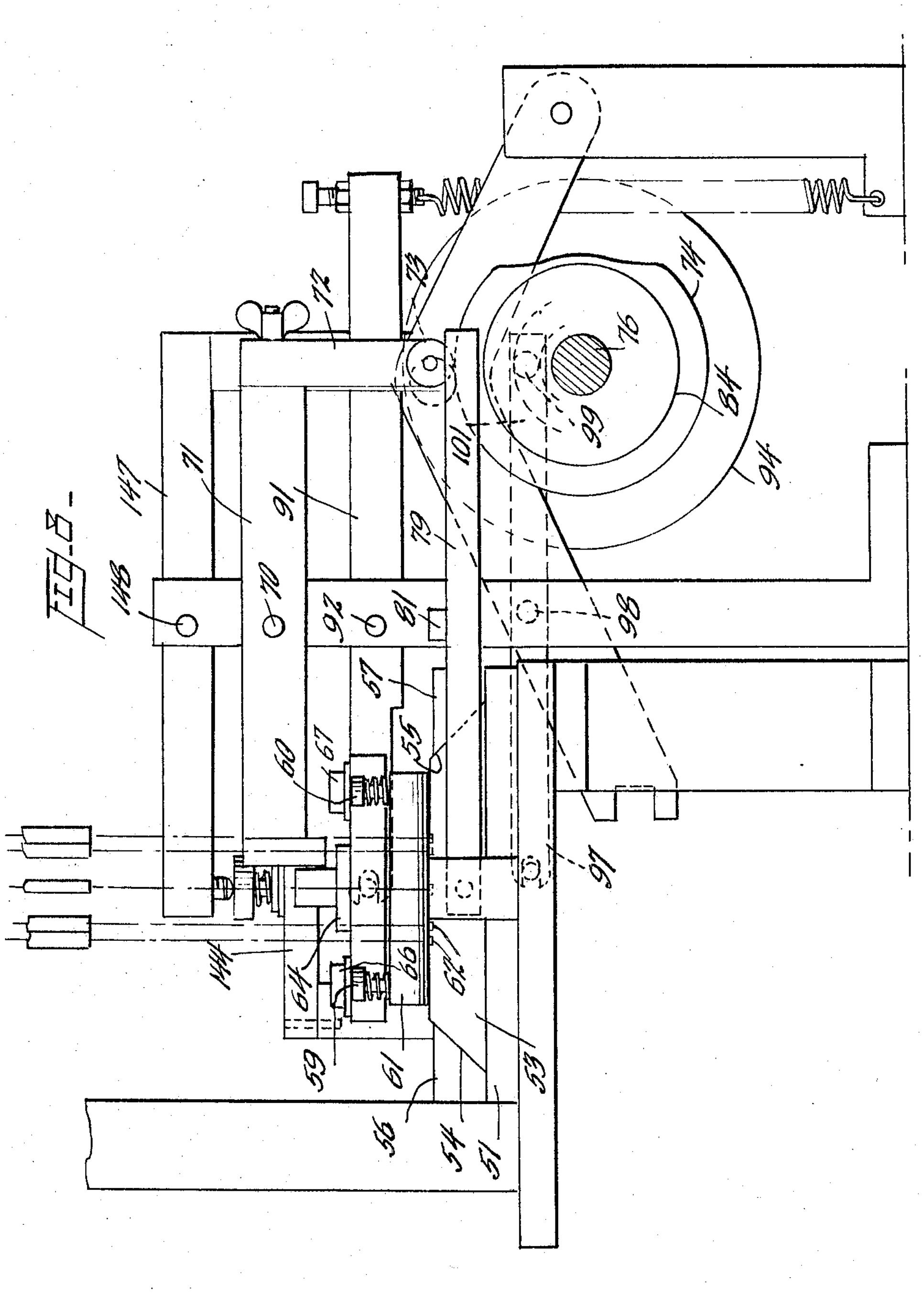
FIG. 8 is a view looking into the left side of the machine shown in FIG. 6 and depicting the levers for gripping, feeding, bending, and severing ribbon of terminal lead stock.

The ribbons or terminal leads 20 are advanced by the slide 53 through the die mechanism 36. This die mechanism includes a pair of die blocks 86 and 87 (see FIG. 10) through which extends passageways 88 to receive the ribbons 20. A die plate 89 is mounted on, but spaced from the die block 86. Extending through the slot formed between the die block 86 and the die plate 89 is the bending element 47 which is attached to a lever 91. As best shown in FIGS. 6 and 8, the lever 91 is pivotally mounted about headed stud shaft 92 and has mounted on its free end a cam follower roller 93 that rides on a cam 94 secured to the shaft 76. When the cam 94 presents a lobe portion to the cam follower 93, the lever 91 is pivoted to move the bending element 47 down to bend the ribbons 20 of lead stock in the manner illustrated in FIG. 14.

Mounted in a slot formed by the die block 87 and downwardly extending gibs 95 of die plate 89, is the cutter blade 46 having a beveled cutting edge 96 (see FIGS. 13–16). Cutter blade 46 is attached to a lever 97 (see FIG. 8) pivotally mounted on a headed stud 98. The free end of the lever 97 has a laterally projecting cam follower 99 which rides within a cam slot 101 formed in the radial face of the cam 94. When the lever 97 is pivoted in a clockwise direction as viewed in FIG. 8, the cutter blade 46 is moved upwardly to sheer the lead stock 20 against the die plate 89. The cutting blade 46 and the bending blade 47 are only operated after a terminal has been secured to the circuit module 25. In practice, the cutting blade 46 will move up to sever the terminal ribbons or leads 20 leaving small projecting sections extending into the slot formed between the guide block 86 and the die plate 89. The inner face of the bending blade 47 is spaced from the forward or end face of the die block 86 by an amount equal to the thickness of the terminal lead stock 20; thus, when the bending blade 47 is moved down upon actuation of the lever 91, the ends of the terminal ribbons or leads 20 will be bent to provide the right angle bend sections 22.

SOLDER WIRE FEED MECHANISM AND SOLDERING DEVICE

Attention is now directed to FIGS. 6, 7, 9, 10, and 12 for a consideration of the solder wire feed mechanism 38 and the soldering device 43. As shown in FIG. 7, the solder wire feed device 38 is mounted on top of plates 106 supported by additional columns 52. This device includes a slide 107 having beveled edges 108 and 109 (see FIGS. 9 and 10) fitted within beveled gibs 110 and 111 (see also FIG. 6) secured to the top plate 106. A pair of headed pins 112 and 113 pass through a guide bar 114 that is spring urged to align the solder wires 33 in guide slots 115 provided in the slide 107. A second pair of pins 116 and 117 provide guides for a bearing plate 118. Depending from the bearing plate 118 are five spring loaded pins 121 which are in alignment with the five solder wires 33, but normally spaced from these wires. Engaging the upper surface of the bearing plate 118 is a roller 122 which is rotatably mounted on a depending arm 123 attached to a lever 124 (see FIG. 9) pivotally mounted about a headed stud shaft 126. As shown in FIG. 6, the lever 124 is provided with a cam follower roller 127 that rides on the periphery of a cam 128 attached to the main cam shaft 76. When a lobe portion of the cam 128 engages the roller 127, the lever 124 is pivoted to move the bearing plate 118 and the attached holding pins 121 in a downward direction. The pins 121 advance into engagement with the solder wires 33 to securely hold these wires against the slide 107.

As illustrated in FIGS. 7 and 10, a bolt 129 is mounted in the rear end of the slide 107 and provides a support for a slide feed lever 131. A spring 132 urges the lever toward the slide 107. As shown in FIG. 6, the movement of the slide is controlled by the pivoting of the lever 131 about a pivot pin 133. The free extremity of the lever 131 has a cam follower roller 134 which rides in a peripheral cam slot 135 formed in a barrel cam 136. It may be appreciated that the rotation of the cam 136 is effective to pivot the lever and impart reciprocating movement to the slide 107. The extent of reciprocating movement can be regulated by adjusting the bolt 129 with respect to a stop bar 137.

Figure 9:
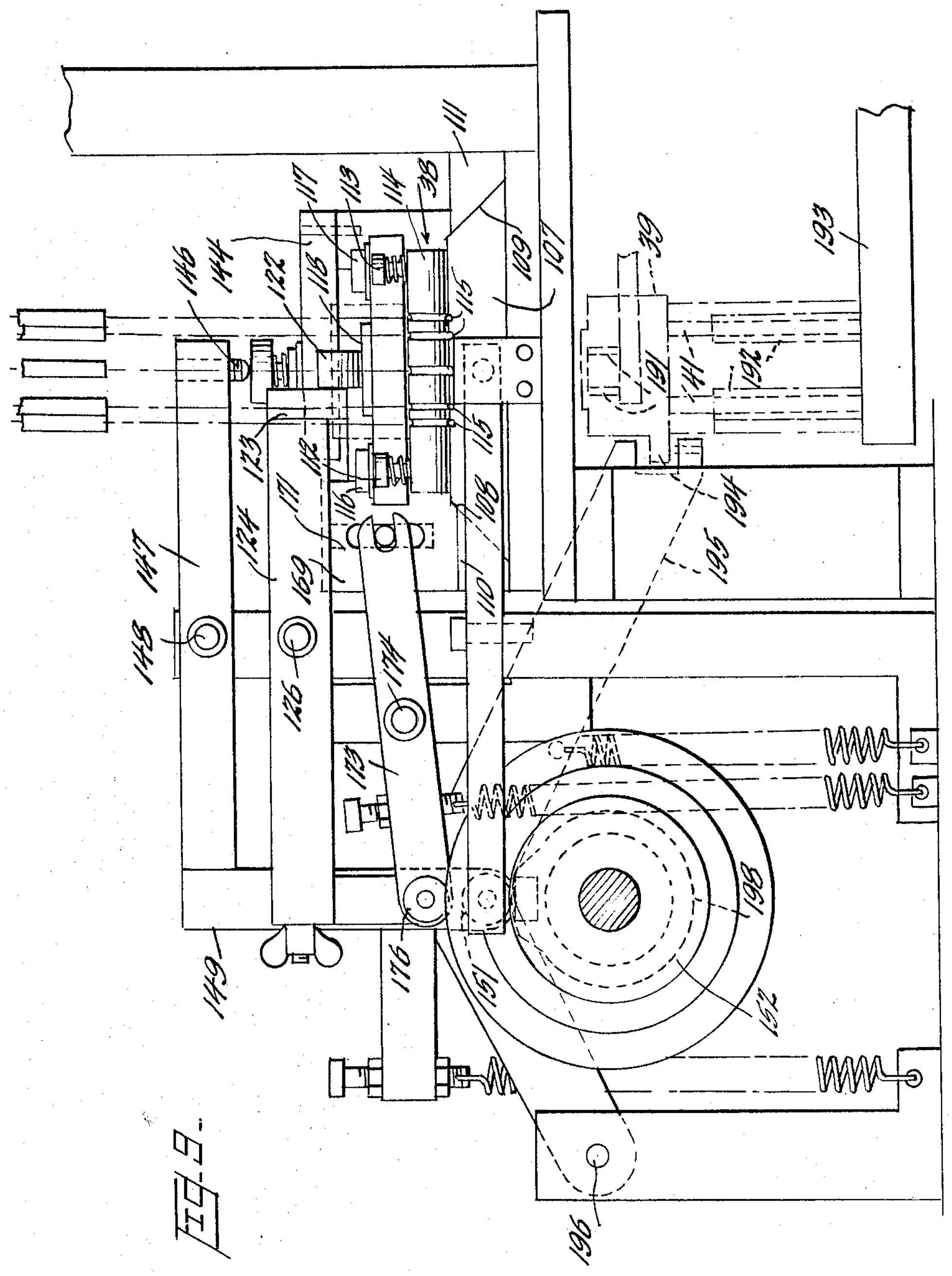
FIG. 9 is a view looking into the right side of the machine shown in FIG. 6 and depicting the levers for gripping and feeding a solder wire together with the facilities for soldering the terminal leads to the circuit film.

When the cam 128 moves the pins 121 into engagement with the solder wires 33 and the lever 131 is pivoted in a counterclockwise direction, the slide 107 moves toward the left as viewed in FIGS. 6, 7, and 10 to advance the solder wires through passageways 138 formed in a standard 139. Projecting from the passageways 138 and secured within the standard 139 are five guide sleevs 141. The advancement of the slide 107 moves the solder wires through the passageways 138 and the guide sleeves 141 to position the ends of these wires in register with soldering elements 44 forming part of the soldering device 43. The standard 139 is provided with a number of bores for receiving spring loaded holding pins 143 which are attached to a spring urged plate 144. The spring urged plate 144 normally withdraws the pins 143 from engagement with the solder wires 33. Referring to FIG. 9, it will be noted that the plate 144 is engaged by an adjusting screw 146 mounted on the end of a lever 147 pivotally mounted on a stud shaft 148. The lever 147 has a depending arm 149 on which is mounted a cam follower roller 151 that rides on the periphery of a cam 152. At the time that the slide 107 is withdrawn, the cam 152 presents a lobe portion to the cam follower 151 to pivot the lever 147 against the spring loaded plate 144 to move the pins 143 into firm engagement with the solder wires 33, thus precluding retrograde movement of the wires 33 during return of the slide 107 to the initial position.

Figure 12:
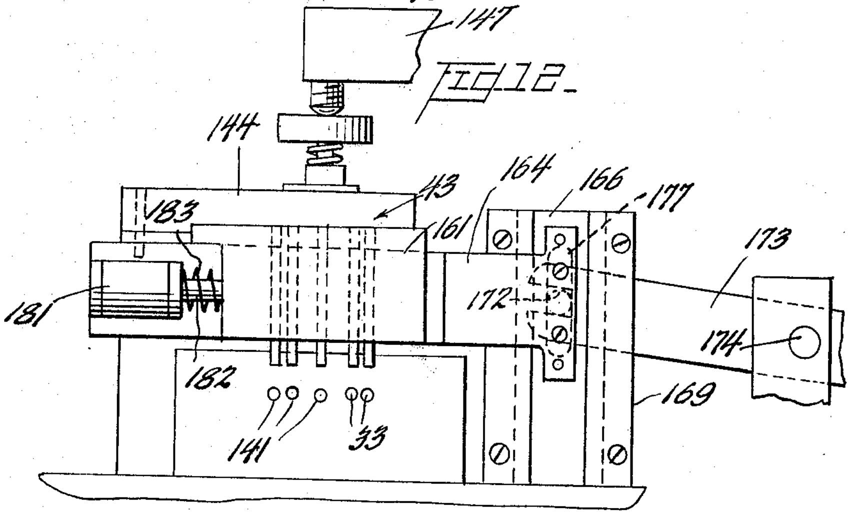
FIG. 12 is a view taken along line 12—12 of FIG. 10 illustrating the front of the soldering facilities.
Figure 13:
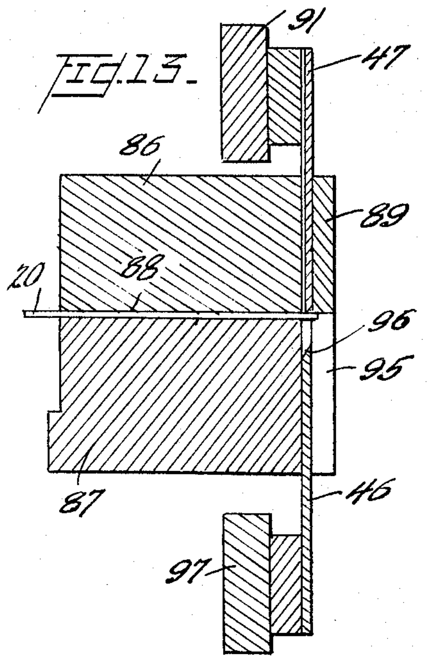
Figure 14:
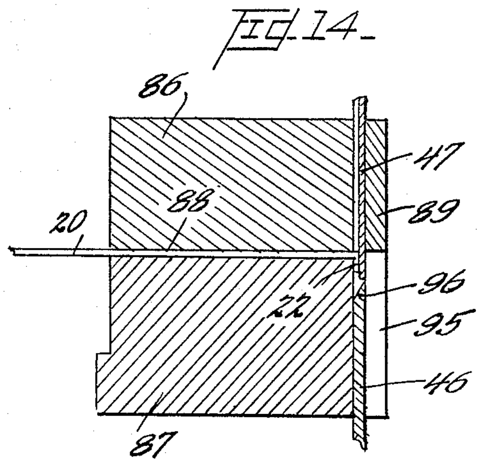
Figure 15:
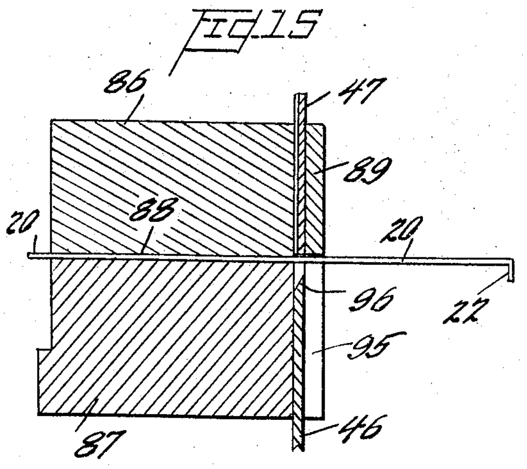
Figure 16:
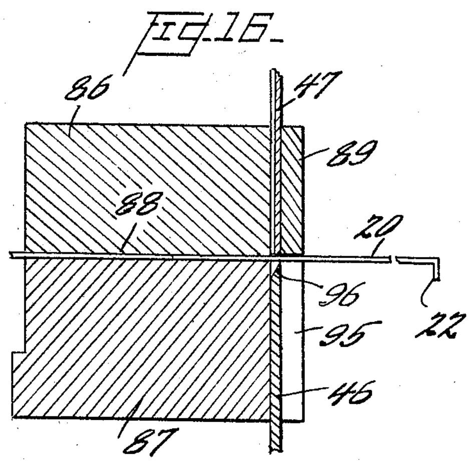

Referring now to FIGS. 10 and 12, the soldering elements 44 in the form of iron coated copper pins are illustrated as being mounted in a cross slide 161 having a dove-tail section 162 positioned within a dove-tail guideway formed in a mounting block 163. Mounting block 163 is attached to a bracket 164 (see also FIGS. 6 and 7) secured at one end to a dove-tail slide 166 mounted within beveled gibs 167 and 168. The gibs 167 and 168 are attached to the face of an upright standard 169 (see FIGS. 9 and 12) having an elongated slot 171 extending therethrough. Rigidly mounted to the slide 166 is a pin 172 extending through the slot 171 and into a bifurcated end of a lever 173 pivotally mounted on a stud shaft 174. Attached to the free end of the lever 173 is a cam follower roller 176 that rides on a cam 177.

When the cam 177 presents a lobe portion to the cam follower 176, the lever 173 is pivoted to move the pin 172 in a downward direction. Movement of the pin 172 is imparted to the slide 166 and the bracket 164 to move the block 163 in a downward direction to advance the soldering elements 44 into engagement with the solder wires 33.

Referring to FIGS. 6 and 12, there is shown a solenoid 181 mounted on the bracket 164 which has an armature 182 attached to the slide 161. A spring 183 urges the slide 161 toward the right to normally position the soldering elements 44 into alignment to the solder wires 33. It has been found that when the soldering operation has been completed and the soldering elements 44 withdrawn, the molten solder at the ends of the wires tends to adhere to the ends of the soldering elements resulting in the formation of peaks. However, this peaking is avoided by energizing the solenoid 181 after completion of the soldering operation thus wiping the solder elements 44 across the solder wires to thus spread the solder and avoid peaking during withdrawal of the soldering elements. This wiping of the solder also acts to uniformly spread the solder that flows down the bent ends 22 of the terminal leads 20 to insure that the solder fillets 28 are formed to surround the junctors of the bent ends 22 and the circuit pattern 24.

WORK HOLDER MEANS

Considering now the mechanism for advancing the circuit module 25 into position to have terminal leads soldered thereto, attention is directed to FIGS. 6 and 9. The circuit module 25 is held on the support 39 by the application of vacuum through passageways 191. The support 39 is attached to guide rods 41 slidably positioned within bearing sleeves 192 that are mounted on a turntable 193. The support 39 is provided with a laterally projecting lip 194 which fits within the bifurcated end of the lever 195 pivotally mounted about a stud shaft 196. The lever 195 is angularly shaped and has a cam follower roller 197 that engages the periphery of the cam 198.

When the cam 198 presents a lobe portion to the cam follower roller 197, the lever 195 is pivoted to move the support 39 in an upward direction. The circuit module is thus advanced into engagement with the bent sections 22 of the terminal leads 20 projecting from the die plate 89 (see FIG. 16) in anticipation of a soldering operation.

SUMMARY OF OPERATION

Referring to FIGS. 6, 7, 8, 9, in conjunction with FIG. 17. the turntable 193 advances a support 39 and a circuit module 25 into position at the start of the cycle of operation of the overall machine. At the start of a cycle of operation, the terminal leads 20 have been bent during the previous operating cycle of the machine in the manner illustrated in FIGS. 3 and 4.

The shaft 76 is rotated one revolution by a conventional means which may be operated by the same power source that indexes the turntable 193. The cam 74 presents a lobe portion to the cam follower 73 to pivot the lever 71 to move the pins 63 into engagement with the terminal leads 20 and thus secure these leads against the slide 53. The cam 84 is then rendered effective to pivot the lever 79 to advance the slide 53 toward the right as viewed in FIGS. 6 and 7, thus moving the bent sections 22 of the leads 20 into the soldering position.

While the bent leads 20 are being fed, the solder wires 33 are also being advanced to position their ends in overlapping relationship to the bent ends of the terminal leads 20. More particularly, at the start of rotation of the shaft 76, the cam 128 presents a lobe portion at the follower 127 to pivot the lever 124 whereupon the pins 121 are moved against the solder wires 33 to securely grip these wires against the slide 107. The cam 136 is now rendered effective to pivot the lever 131 to advance the slide 107 toward the left as viewed in FIGS. 6 and 7. The gripped solder wires 33 are moved through the guide sleeves 141 into the soldering position and into register with the soldering elements 44. Next, the cam 198 pivots the lever 195 to move the work support 39 in an upward direction to about the circuit pattern 24 on the module 25 against the bent end surfaces 23 of the terminal leads 20.

The cam 177 then pivots the lever 173 to move the soldering device 43 and the solder elements 44 into engagement with the ends of the solder wires 33. The molten solder will flow down the bent sections of the terminal leads to form bonding fillets 28 along the juncture of the bent sections 22 with the circuit pattern 24. While the soldering elements 44 are in the down position, a cam 201 mounted on the shaft 76 completes a simple energizing circuit (not shown) for the solenoid 181.

Energization of this solenoid pulls the slide 161 to move the soldering elements 44 across the molten solder prior to withdrawal of the solder elements 44, thus precluding peaking of the molten solder during subsequent withdrawal of the solder elements. The solder is also uniformly distributed over the top of the terminal leads 20 to insure a uniform flow which results in a formation of fillets 28 completely surrounding the ends of the bent sections 22 of the terminal leads 20.

A cam slot 101 formed in the radial face of the cam 94 presents a lobe portion to pivot the lever 97 which moves the cutter 46 against the terminal leads 20, thus severing these leads leaving laterally extending terminal leads bonded to the circuit pattern 24. The cam 94 is now rendered effective to pivot the lever 91 and thus move the bending element 47 down to bend the ends of the terminal leads 20 against the die block 87 (see FIG. 14) in anticipation of the next cycle of operation of the overall machine.

Prior to restoration of the solder feed mechanism 38 to the initial position, cam 152 pivots the lever 147 about stud shaft 148 to move the pins 143 down into engagement with the solder wires 33, thus precluding retrograde movement of the solder wires during restoration of the slide 107 to the initial position. While the cutting and bending operations are being performed, the cam 198 is effective to restore the module support 39 to the original position. All component mechanisms are now restored to the condition necessary for another cycle of operation of the overall machine.

It is to be understood that the above-described arrangements of apparatus and construction of elemental parts are simply illustrative of an application of the principles of the invention and many other modifications may be made without departing from the invention.

What is claimed is:

1. In a machine for soldering a terminal lead to a circuit pattern,
   means for bending the end of a section of terminal stock,
   means for advancing the terminal stock through the bending means to advance the bent end of terminal stock,
   a support for holding the circuit pattern in engagement with the tip of said bent end,
   means rendered effective upon advance of the stock for flowing solder down the bent section of the terminal stock and onto the circuit path,
   and means for severing the stock to form a terminal lead.

2. In a machine for attaching terminal leads to an electrical component,
   a plurality of sources of supply of terminal strips,
   means for bending each end portion of each of said terminal strips to form right angle bends,
   means rendered effective following operation of said bending means for advancing the terminal strips to advance the right angle bends,
   means for supporting a circuit module in engagement with the ends of the right angle leads,
   means rendered effective after advance of said terminal strips for soldering the right angle bends to said electrical component, and
   means rendered effective upon operation of said soldering means for shearing said terminal strips to leave terminals soldered to and extending from said electrical component.

3. In a machine for soldering a terminal lead to a circuit module,
   a die block having a passageway extending therethrough for receiving terminal lead stock,
   bending means cooperating with said die block for bending an end of the terminal lead stock projecting from said passageway,
   means for advancing said terminal lead stock to advance said bent end,
   means for advancing a circuit module into engagement with said bent end,
   means rendered effective upon engagement of said circuit module and bent end for flowing molten solder along said bent end to solder said bent end to said circuit module,
   and means rendered effective after operation of said soldering means and cooperable with said die block for severing said terminal lead stock.

4. In a machine for ataching a lead to a circuit module,
   a slide,
   a die block having a passageway therethrough,
   means for reciprocating the slide toward and away from said die,
   means rendered effective upon forward movement of the slide for gripping lead stock against said slide to advance said lead stock through said passageway and releasing said lead stock up on reverse movement of said slide,
   means rendered effective upon advance of said lead stock through said passageway for attaching the end of said lead stock to said circuit module,
   means rendered effective upon advance of said slide and cooperating with said die block for severing said lead stock, and
   means cooperating with said die block for bending the unsevered end of said lead stock to preclude retrograde movement of the lead stock with said slide.

5. In a machine for securing a terminal lead having a right angle bent section to a circuit module,
   a supply of solder wire,
   a pair of slide means having, respectively, facilities for grippnig said terminal lead and said solder wire,
   means for moving said slides toward each to advance the solder wire in overlying relationship to said bent section of said terminal lead,
   means for holding said circuit module in engagement with the end face of said bent section,
   a soldering device mounted for movement toward and across said solder wire, and
   means for actuating said soldering device to move and melt said solder to flow along said bent section and onto said circuit module.

6. In a machine for attaching a lead to a circuit module,
   means for bending a forward section of a strip of lead stock to form a right angle section,
   means for advancing the lead stock to move the right angle section,
   means for advancing the circuit module into engagement with the end of the right angle section,
   means for advancing a leading end of a section of solder stock over the right angle bend,
   means rendered effective upon advance of said solder stock for heating and melting the end of said solder stock to flow said melted solder down the bent end of said lead stock and onto said circuit module,
   means for shifting said heating means to spread said solder to run uniformly down said bent end and solidify and bond the tip of said right angle section to said circuit module, and
   means rendered effective after shifting of said heating means for severing said lead stock to provide a lead extending from and bonded to said circuit module.

7. In a machine for securing a terminal lead to a circuit pattern,
   a stationary die having a passageway extending from one end face for receiving terminal lead stock with an end projecting beyond said end face,
   a first blade slidably mounted on said end face and spaced a distance therefrom sufficient to receive a terminal lead stock,
   means for sliding said first blade along said end face to bend the projecting end rotating end section of said terminal lead stock, means for advancing said terminal lead stock, means for supporting a circuit module in engagement with the bent end of said advanced terminal lead stock, means rendered effective after engagement of said bent end of said lead stock and said circuit module for soldering said bent end to said circuit module, a die plate spaced from said end face of said stationary die, a second blade mounted for movement between said end face and said die plate, said second blade having a cutting edge beveled toward said die plate, and means rendered effective upon soldering of said end to said circuit module for advancing said second blade between said end face and die plate to advance said beveled edge to sever said lead stock to leave an end of said stock projecting beyond said end face.

8. In a machine for attaching a terminal lead to a heat sensitive circuit module, a first die for suporting a ribbon of terminal stock on the top surface thereof, a second die spaced above and spaced laterally from a forward side of the first die, a first blade slidably mounted on said forward side of the first die and having a top edge beveled toward the second die, a second blade slidably mounted in the lateral space between said first and second dies and spaced from said forward side of said first die, means for moving said second blade to bend said terminal stock against said first die to form a right angle bend section, means for advancing said terminal stock to advance said right angle bend section into a soldering position, means for moving a circuit module into engagement with the end face of said angle bend section in the soldering position, means for flowing solder down said right angle bend section to solder said section to said circuit module, and means for moving said first blade to move said bevel edge to shear said terminal stock against said second die to leave a section of said terminal stock projecting beyond said forward side of said first die.

9. In a machine for soldering a terminal lead to a circuit module, a pair of opposed slides spaced from each other and mounted for movement toward and away from each other, a ribbon supply of terminal lead stock, a supply of solder wire, means for gripping said terminal lead stock against a first of said slides, means for gripping solder wire against a second of said slides, a device positioned between said slides for shearing and bending said terminal lead stock, means for simultaneously moving said slides toward each other to advance the solder wire and terminal stock in overlying relationship, means rendered effective upon completion of movement of said slides for advancing the circuit module into engagement with said terminal lead stock, a soldering device mounted for movement into engagement with the end of said solder wire, means rendered effective upon actuation of said circuit module advancing means for moving said soldering device into engagement with said solder wire to melt said solder wire to solder the end of said terminal lead stock to said circuit module, and means for operating said device to shear and bend said terminal lead stock.

References Cited by the Examiner

UNITED STATES PATENTS 3,200,857 8/1965 Miller ............... 228—5

JOHN F. CAMPBELL, *Primary Examiner.*

M. L. FAIGUS, *Assistant Examiner.*